US012033667B2

(12) United States Patent
Sundareson

(10) Patent No.: US 12,033,667 B2
(45) Date of Patent: Jul. 9, 2024

(54) DETERMINING HIGH-INTEREST DURATIONS OF GAMEPLAY SESSIONS FROM USER INPUTS

(71) Applicant: NVIDIA Corporation, Santa Clara, CA (US)

(72) Inventor: Prabindh Sundareson, Bangalore (IN)

(73) Assignee: NVIDIA Corporation, Santa Clara, CA (US)

( * ) Notice: Subject to any disclaimer, the term of this patent is extended or adjusted under 35 U.S.C. 154(b) by 209 days.

(21) Appl. No.: 17/405,350

(22) Filed: Aug. 18, 2021

(65) Prior Publication Data
US 2021/0383838 A1 Dec. 9, 2021

Related U.S. Application Data

(63) Continuation of application No. 16/586,506, filed on Sep. 27, 2019, now Pat. No. 11,158,346.
(Continued)

(51) Int. Cl.
*A63F 13/497* (2014.01)
*A63F 13/23* (2014.01)
(Continued)

(52) U.S. Cl.
CPC ............ *G11B 27/031* (2013.01); *A63F 13/23* (2014.09); *A63F 13/497* (2014.09);
(Continued)

(58) Field of Classification Search
CPC ..... G11B 27/031; G11B 27/005; G11B 27/34; A63F 13/23; A63F 13/497;
(Continued)

(56) References Cited

U.S. PATENT DOCUMENTS

| 8,651,961 B2 | 2/2014 | Muller |
| 9,088,823 B1 | 7/2015 | Price |

(Continued)

FOREIGN PATENT DOCUMENTS

| JP | 2014121610 A | 7/2014 |
| WO | 2018/140515 A1 | 8/2018 |

OTHER PUBLICATIONS

"GoPro Time Lapse: Beginners Guide (step by step) Video Tutorial", Retrieved from Internet URL: https://projectgo.pro/gopro-time-lapse/, accessed on Aug. 5, 2019, pp. 40.
(Continued)

*Primary Examiner* — Allen Chan
(74) *Attorney, Agent, or Firm* — Taylor English Duma L.L.P.

(57) ABSTRACT

In various examples, durations of relatively high user activity within a gameplay session may be determined from user input events using a running user activity measurement. Once a duration is identified, it may be further analyzed to merge the duration with one or more other durations and/or to determine or predict whether the duration would be of sufficient interest for further action. A user interest score for an identified duration may be computed based on a set of the user input events that occur in the duration and used to determine and/or predict whether the duration would be of sufficient interest for further action. In some cases, an action may be performed based on determining the user interest score is greater than a statistical value that is computed from user interest scores of multiple identified durations.

20 Claims, 9 Drawing Sheets

Related U.S. Application Data

(60) Provisional application No. 62/868,654, filed on Jun. 28, 2019.

(51) Int. Cl.
  *G11B 27/00* (2006.01)
  *G11B 27/031* (2006.01)
  *G11B 27/34* (2006.01)
  *H04L 65/60* (2022.01)
  *H04L 67/131* (2022.01)
  *H04L 67/50* (2022.01)

(52) U.S. Cl.
  CPC ............ *G11B 27/005* (2013.01); *G11B 27/34* (2013.01); *H04L 65/60* (2013.01); *H04L 67/131* (2022.05); *H04L 67/535* (2022.05); *A63F 2300/1025* (2013.01); *A63F 2300/634* (2013.01)

(58) Field of Classification Search
  CPC ....... A63F 2300/1025; A63F 2300/634; H04L 67/131; H04L 67/535; H04L 65/60
  USPC .......................................................... 463/31
  See application file for complete search history.

(56) References Cited

U.S. PATENT DOCUMENTS

| | | | |
|---|---|---|---|
| 9,242,176 | B2 | 1/2016 | Miura et al. |
| 9,345,966 | B2 | 5/2016 | Miura et al. |
| 9,364,743 | B2 | 6/2016 | Miura et al. |
| 10,102,430 | B2 * | 10/2018 | Vunic ................ G06V 20/49 |
| 10,245,509 | B2 * | 4/2019 | Marr .................. A63F 13/355 |
| 10,335,690 | B2 * | 7/2019 | Schleicher ........... G11B 27/031 |
| 2006/0059225 | A1 | 3/2006 | Stonehocker et al. |
| 2008/0242425 | A1 | 10/2008 | Isaka et al. |
| 2010/0035689 | A1 | 2/2010 | Altshuler et al. |
| 2012/0100910 | A1 | 4/2012 | Eichorn et al. |
| 2015/0024839 | A1 | 1/2015 | Zahn et al. |
| 2015/0202529 | A1 | 7/2015 | Paradise et al. |
| 2015/0217196 | A1 | 8/2015 | McCarthy et al. |
| 2016/0059137 | A1 | 3/2016 | Zahn et al. |
| 2016/0158656 | A1 | 6/2016 | Condrey |
| 2017/0282077 | A1 | 10/2017 | De La Cruz |
| 2018/0078862 | A1 | 3/2018 | Schleicher |
| 2018/0161675 | A1 | 6/2018 | Miron et al. |
| 2019/0313024 | A1 | 10/2019 | Selinger et al. |
| 2019/0392866 | A1 | 12/2019 | Yoon et al. |
| 2020/0155933 | A1 | 5/2020 | Pierce et al. |

OTHER PUBLICATIONS

"XMP Specification Part 3—Storage in Files", Adobe Systems Incorporated, p. 80 (2016).

"YouTube Player API reference for iframe Embeds", Retrieved from Internet URL : https://developers.google.com/youtube/iframe_api_reference, accessed on Aug. 5, 2019, pp. 43.

Bernardi, M. L., et al., "A Time Series Classification Approach to Game Bot Detection", In Proceedings of the 7th International Conference on Web Intelligence, Mining and Semantics, ACM, pp. 1-11, (Jun. 2017).

Guerin, J., et al., "CNN Features Are Also Great At Unsupervised Classification", arXiv:1707.01700v2 [cs.Cv], pp. 12 (Sep. 11, 2018).

Harvey, M., "Five video classification methods implemented in Keras and TensorFlow", pp. 1-14 (2017) Retrieved from the Internet URL: https://blog.coast.ai/five-video-classification-methods-implemented-in-keras-and-tensorflow-99cad29cc0b5, accessed on Jul. 29, 2019.

Kaminsky, R., et al., "Identifying Game Players with Mouse Biometrics," University of Washington, Technical Report, pp. 1-14 (Dec. 8, 2008).

Limman, C., "What Influences Keyboard Input Speed", Keyboard Information, Wooting Developer Blog, The Analog Mechanical Keyboard, pp. 1-12 (May 31, 2018).

Lutz, C., et al., "Efficient k-means on GPU", Association for Computer Machinery, ACM, pp. 1-3 (Jun. 11, 2018).

Platzer, C., "Sequence-Based Bot Detection in Massive Multiplayer Online Games", In 8th International Conference on Information, Communications & Signal Processing, IEEE, pp. 1-5 (2011).

Ringer, C., and Nicolaou, M. A., "Deep Unsupervised Multi-View Detection of Video Game Stream Highlights", Association for Computing Machinery, ACM, pp. 1-6 (2018).

Vailaya, A., et al., "Video Clustering" Michigan State University, Technical Report, pp. 1-8 (1996).

Notice of Allowance dated Sep. 23, 2021 in U.S. Appl. No. 16/928,222, 2 pages.

International Preliminary Report on Patentability received for PCT Application No. PCT/US2019/053647, dated Jan. 6, 2022, 10 pages.

Sundareson, Prabindh; First Office Action for Japanese Patent Application No. 2021-565722, filed Nov. 4, 2021, mailed Jan. 19, 2024, 5 pgs. *English Translation Provided.

Sundareson, Prabindh; International Search Report and Written Opinion for PCT Application No. PCT/US2019/053647, filed Sep. 27, 2019, mailed Feb. 27, 2020, 15 pgs.

* cited by examiner

DETERMINING HIGH-INTEREST DURATIONS OF GAMEPLAY SESSIONS FROM USER INPUTS

CROSS-REFERENCE TO RELATED APPLICATIONS

This application claims priority to U.S. Provisional Patent Application No. 62/868,654, filed on Jun. 28, 2019, and entitled "Unsupervised Categorization of Gameplay Video Using Machine Learning Models". This application is a continuation of U.S. patent application Ser. No. 16/586,506, titled "Determining High-Interest Durations Of Gameplay Sessions From User Inputs," filed Sep. 27, 2019. Each of these applications is incorporated herein by reference in its entirety.

BACKGROUND

Determining whether particular sections of a gameplay session include interesting content (e.g., more action) can be helpful in various contexts. For example, a gamer may wish to only share or save select clips of a gameplay session that include interesting content (e.g., game highlights), instead of sharing or saving a video file of the entire gameplay session.

Some conventional approaches to identifying interesting portions of gameplay in a gameplay session are manual and rely on a user's judgement, such as to edit a gameplay session recording using a video editor. To do so, a player (e.g., gamer) of a gaming application may use software to record his or her entire gameplay session (e.g., often 30 minutes to 1 hour or longer) to a local machine, often resulting in a large video file (e.g., several Gigabytes). The user may then view and edit the video file. This requires significant time and computing resources and can introduce large delays between a live gameplay session and the availability of an edited gameplay session recording for sharing and/or viewing.

Other conventional approaches may be automated and rely on an object detection model that detects objects (e.g., items, players, etc.) in a gameplay session. The system may identify and classify potentially interesting or high-action video clips based on the detected objects. However, the object detection model may be relatively error prone and subject to mischaracterization. For example, the accuracy of the object detection model often depends on the quality of visual data it analyzes to detect objects—which may be highly variable—especially in streaming gameplay session scenarios. Also, because the object detection model is trained using supervised learning, large sets of game-specific training data may be required. Such game-specific training data may be difficult to generate and may require manual labelling. Thus, a separate object detection model is required for each game. Moreover, many games are frequently updated with new content (e.g., new characters, weapons, vehicles, outfits, etc.) that has not been taken into account in the training data. The new content may require retraining of the object detection model and/or may further reduce the model's accuracy.

SUMMARY

Embodiments of the present disclosure relate to determining high-interest durations of gameplay sessions from user inputs. Systems and methods are disclosed that leverage user input data available from user input devices to determine and/or predict whether a duration within a gameplay session would be of sufficient interest for further action (e.g., to use or suggest for a game highlight).

The disclosure provides for automatically determining, from user input data of gameplay sessions, durations of relatively high user activity within the gameplay sessions that are likely to include interesting content (e.g., more action). In contrast to conventional approaches, a running user activity measurement (e.g., corresponding to a frequency of user input events, such as keys per second) may be computed from user input over a gameplay session to determine durations of relatively high user activity within the gameplay session (e.g., where the user activity measurement exceeds a threshold value). Once a duration is identified, it may be further analyzed to merge the duration with one or more other durations and/or to determine or predict whether the duration would be of sufficient interest for further action.

The disclosure also provides for determining and/or predicting whether a duration within a gameplay session would be of interest for further action based on user input events during the gameplay session. In contrast to conventional approaches, the system may compute a user interest score for a duration of relatively high user activity based on a set of the user input events that occur in the duration. The system may use the user interest score to determine and/or predict whether the duration is of sufficient interest for further action. For example, the system may compute a statistical value on user interest scores of a plurality of durations of the gameplay session (and/or other gameplay sessions) and an action may be performed based at least in part on comparing the user interest score of the duration to the statistical value (e.g., determining the user interest score is greater than the statistical value). In some embodiments, the statistical value corresponds to a median absolute deviation score that is computed for the user interest scores.

BRIEF DESCRIPTION OF THE DRAWINGS

The present systems and methods for determining high-interest durations of gameplay sessions from user inputs is described in detail below with reference to the attached drawing figures, wherein.

DETAILED DESCRIPTION

Figure 1:
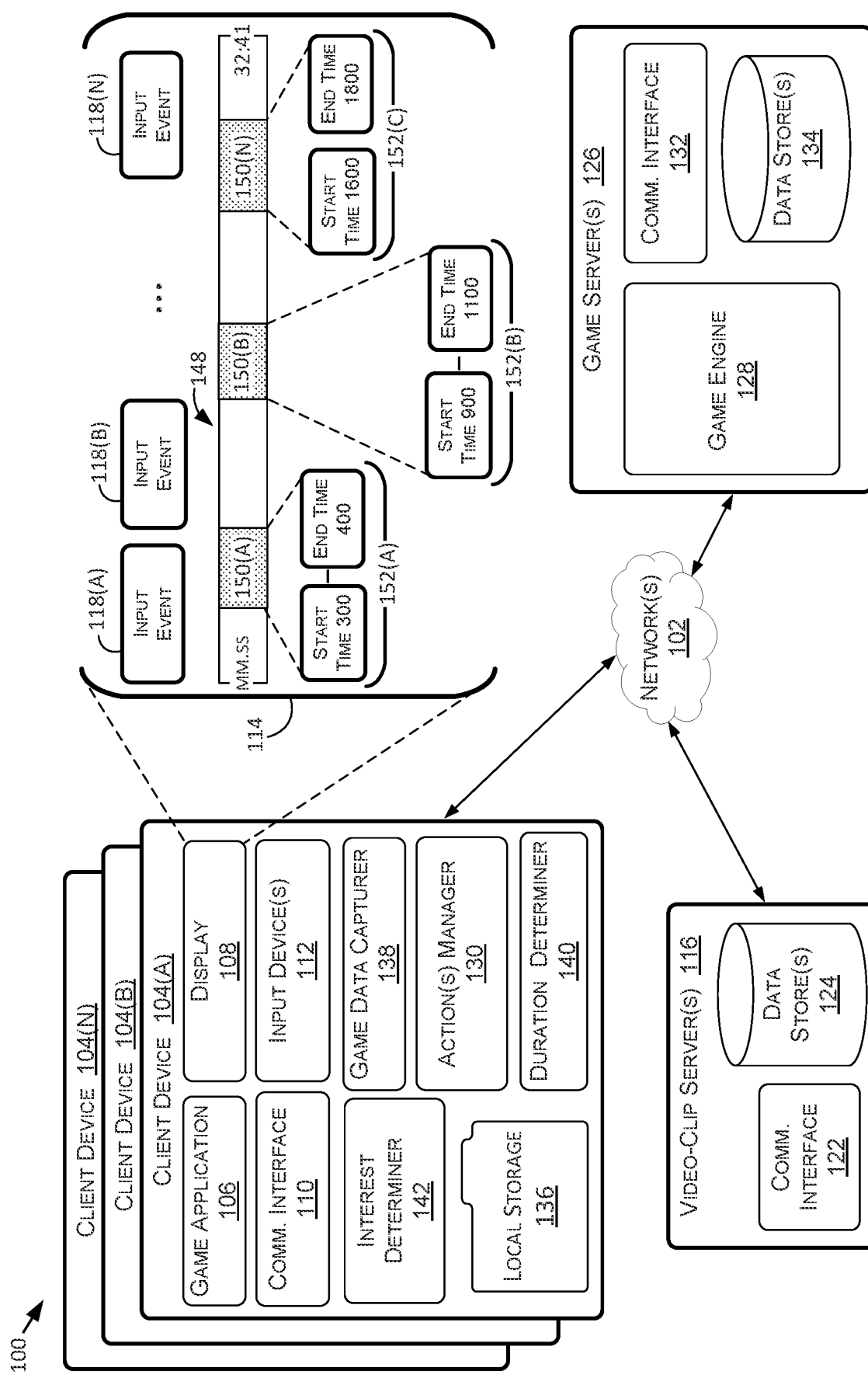
FIG. 1 is an example system diagram for determining high-interest durations of gameplay sessions from user inputs, in accordance with some embodiments of the present disclosure.

The disclosure provides approaches which may be used to automatically identify durations of relatively high interest within a gameplay session. The disclosure also provides approaches for determining and/or predicting whether a duration within a gameplay session would be of sufficient interest for further action. These approaches may be used separately or in combination. For example, in combination, the approaches may be used to automatically identify durations of relatively high interest within a gameplay session and determine and/or predict whether the identified durations would be of sufficient interest for further action. Various types of actions are contemplated as being without the scope of the present disclosure, examples of which are described herein.

In embodiments, as a user (e.g., gamer) plays a game, user inputs may be captured and used to generate (e.g., periodically during or after the gameplay session) a running user activity measurement (e.g. a metric) collected over a period of time of a gameplay session. The user activity measurement may be used to determine and/or identify durations of relatively high user activity within the gameplay sessions and—in some embodiments—corresponds to a frequency of user input events (e.g., keys per second) generated by the user inputs. Once a duration is identified, it may be further analyzed to merge the duration with one or more other durations and/or to determine or predict whether the duration would be of sufficient interest for further action (e.g., using approaches described herein).

In some embodiments, the system may identify a duration based on a time(s) that the user activity measurement exceeds a threshold value. For example, a start of the duration may correspond to a time at which the user activity measurement is greater than the threshold value and/or an end of the duration may correspond to a time at which the user activity measurement is less than the threshold value. The threshold value may correspond to a statistic computed from values of the user activity measurement over the gameplay session and/or many gameplay sessions of the user and/or other users. For example, the statistic may correspond to an average or percentile of the user activity measurement over the gameplay session(s).

To determine and/or predict whether a duration within a gameplay session is of sufficient interest for further action, the system may analyze user input events generated by user inputs to one or more input devices during the gameplay session. To do so, the system may compute a user interest score for a duration of relatively high user activity based on a set of the user input events that occur in the duration. For example, the user interest score may be based on various factors, such as a number of the user input events that occur in the duration (density), one or more action commands that are entered during the duration, a length of the duration, and/or an actuation speed (urgency) of the one or more input devices during the duration. The system may use the user interest score to determine and/or predict whether the duration is of sufficient interest for further action. For example, the system may compute a statistical value on user interest scores of a plurality of durations of the gameplay session (and/or other gameplay sessions) and an action may be performed based at least in part on comparing the user interest score of the duration to the statistical value (e.g., determining the user interest score is greater than the statistical value or other threshold value). In some embodiments, the statistical value corresponds to a Median Absolute Deviation (MAD) score that is computed for the user interest scores.

Using disclosed approaches, the processing required to determine durations of relatively high interest may be reduced by focusing the analysis on durations of a gameplay session that include relatively high user activity. Further, the computing resources used by the system to identify the durations for further analysis may be low, as analysis of video data is not required (although may be used in some embodiments). Also, in examples where the user activity measurement is monitored during the gameplay session, the durations may be identified and actions may be performed during the gameplay session. Thus, for example, the system may use the actions to affect the gameplay session and/or to begin or complete actions to prepare for completion of the gameplay session (e.g., the process of identifying game highlights).

Various potential actions may be performed based on determining and/or predicting a duration of interest within a gameplay session. For example, the system may present or cause presentation of an indication of the duration. The indication may comprise, for example, a notification or other indicator presented during the gameplay session, a highlight reel of video clips (or game summarization) presented after or at the end of the gameplay session that corresponds to the duration, and/or a graphical element operable to save and/or share a video clip that corresponds to the duration. In some examples, an action may include performing further analysis on the duration, such as by applying image and/or video data of the duration to an object detection model or other machine learning model (e.g., deep learning and/or convolutional neural network models). For example, the object detection model may be used to identify one or more objects in a scene, and based on the one or more objects, the system may present content to the user during the gameplay session. This may include, for example, presenting a recommendation that is based on the object(s) such as a button(s) to press or other user inputs to provide for a given situation. In further respects, a duration of interest may be identified to a user to assist the user in generating and/or selecting ground truth data (e.g., corresponding to the duration) to train a machine learning model.

With reference to FIG. 1, FIG. 1 is an example system diagram for determining high-interest durations of gameplay sessions from user inputs, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, software, or any combination thereof. For instance, various functions may be carried out by a processor executing instructions stored in memory.

The interest determining system 100 of FIG. 1 may include, one or more components instantiated using among other things, client devices 104(A), 104(B), and 104(N) (referred to collectively herein as "client devices 104"), a video-clip server(s) 116, and/or a game server(s) 126. Although the client devices 104(A), 104(B), and 104(N) are illustrated in FIG. 1, this is not intended to be limiting. In any example, there may be any number of the client devices 104. The interest determining system 100 (and the components and/or features thereof) may be implemented using one or more computing devices, such as the computing device 900 of FIG. 9, described in more detail below.

Components of the interest determining system 100 may communicate over a network(s) 102. The network(s) 102 may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the interest determining system 100 may communicate with one or more of the other components via one or more of the network(s) 102.

The client devices 104 may include a smart phone, a laptop computer, a tablet computer, a desktop computer, a wearable device, a game console, a virtual reality system (e.g., a headset, a computer, a game console, remote(s), controller(s), and/or other components), a streaming device, (e.g., an NVIDIA SHIELD), a smart-home device that may include an intelligent personal assistant, and/or another type of device capable of supporting game play.

The client devices 104 may each include a game application 106, a display 108, a communication interface 110, an input device(s) 112, a local storage 136, a game data capturer 138, an actions manager 130, a duration determiner 140, and an interest determiner 142. Although only a few components and/or features of the client device 104 are illustrated in FIG. 1, this is not intended to be limiting. For example, the client devices 104 may include additional and/or alternative components, such as those described below with respect to the computing device 900 of FIG. 9.

The game application 106 may be a mobile application, a computer application, a console application, and/or another type of application. The game application 106 may include instructions that, when executed by a processor(s), cause the processor(s) to, without limitation, receive input data representative of user inputs to the one or more input device(s) 112, transmit the input data to the game server(s) 126, retrieve game data from memory or local storage, receive the game data using the communication interface 110 from the game server(s) 126, and cause display of the game on the display 108. In other words, the game application 106 may operate as a facilitator for enabling playing of a game associated with the game application on the client devices 104. The game application 106 may also include instructions that, when executed by a processor(s), cause the processor(s) to transmit data to, and receive data from, the video-clip server(s) 116. For example, the game application 106 may transmit to the video-clip server(s) 116 video recordings generated when games are played on the client devices 104, and receive from the video-clip servers(s) 116 video clips that that are associated with identified durations of relatively high interest by interest determiner 142.

The game application 106 and/or patches or updates to the game application 106 may be downloaded from the game server(s) 126 or may be downloaded from another server(s), such as a server of a content delivery network (CDN). For example, the game server(s) 126 may be located in a different country or on a different continent, so to reduce the download time, the game application 106 and/or the patches or updates may be stored on different servers around the globe. As such, when the client devices 104 are downloading the game application 106 and/or the patches or updates, the client devices 104 may connect to a more local server that is part of the CDN, for example.

In some examples, the client devices 104 may render the game using the game application 106, while in other examples, the client devices 104 may receive display data (e.g., encoded display data, as described with respect to FIG. 8) and use the display data to display the game on the display 108. In some examples, a first client device, such as client device 104(A), may render the game while a second client device, such as client device 104(B), may receive the display data and display the game using the display data. In examples where the display data is received by the client device (e.g., where the client device 104 does not generate the rendering), the interest determining system 100 may be part of a game streaming system, such as the game streaming system 800 of FIG. 8, described in more detail below.

The client device 104(A) may display, via the display 108, a plurality of gameplay sessions over time, such as a gameplay session 114. The gameplay sessions, such as the gameplay session 114, may include any number of gameplay sessions participated in by users of the client device 104(A). Similarly, users of each of the client devices 104, in addition to the client device 104(A), may participate in any number of gameplay sessions.

The display 108 may include any type of display capable of displaying a game (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 108 may include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen is at least one of the input device(s) 112 of the client device 104.

The input device(s) 112 may include any type of devices that are capable of providing user inputs associated with a game, such as user inputs to the game and/or used to control the game. The input device(s) may include a keyboard, a mouse, a microphone(s), a touch-screen display, a controller(s), a remote(s), a headset (e.g., sensors of a virtual reality headset), and/or other types of input devices.

The communication interface 110 may include one or more components and features for communicating across one or more networks, such as the network(s) 102. The communication interface 110 may be configured to communicate via any number of network(s) 102, described herein. For example, to communicate in the interest determining system 100 of FIG. 1, the client devices 104 may use an Ethernet or Wi-Fi connection through a router to access the Internet in order to communicate with the video-clip server(s) 116, the game server(s) 126, and/or with others of the client devices 104.

The local storage 136 may include any of a variety of computer-readable media. The computer-readable media may be any available media that can be accessed by the client device 104(A). The computer-readable media may include both volatile and nonvolatile media, and removable and non-removable media. By way of example, and not limitation, the computer-readable media may comprise computer-storage media and communication media. The local storage 136 may include additional or alternative components, such as those described below with respect to the memory 904 of FIG. 9.

Additional aspects will now be described, including operations that may be carried out in the course of rendering the gameplay session 114 and/or analyzing game-session data (e.g., user input data and/or video data associated with a gameplay session) generated as a result of playing the game during the gameplay session 114. The gameplay session 114 may be associated with any number of input events 118(A)-118(N) (referred collectively herein as "input events 118" or "user input events 118"), a timeline 148, time segments 150(A)-150(N) (referred collectively herein as "time segments 150"), and durations 152(A)-152(N) (referred collectively herein as "durations 152").

In accordance with embodiments of the disclosure, the duration determiner 140 may analyze the game-session data to identify one or more of the durations 152(A)-152(N) of relatively high user activity during the gameplay session 114. Additionally or alternatively, the interest determiner 142 may analyze the durations 152(A)-152(N) to determine and/or predict whether an identified duration is of sufficient interest for further action based on corresponding game-session data.

The game application 106 and/or the game data capturer 138 may include instructions that, when executed, record or otherwise capture at least some of the game-session data (e.g., corresponding to the input events 118 and/or video frames of gameplay) from gameplay sessions 114 and store the recorded game-session data locally on the client device 104 (e.g., in local storage 136) or transmit the recorded game-session data to the video-clip server 116 or the game server 126 to be stored in the data stores(s) 124 and/or 134, respectively. Game-session data may include user input data associated with a gameplay session and/or video data associated with a gameplay session. In examples where the client device 104 does not generate the rendering of a game (such as the game streaming system 800 of FIG. 8 described in more herein), the game server(s) 126 might record and store the video data or transmit the video data to the video-clip server(s) 116 for storage in the data store(s) 124.

The game data capturer 138 may be part of the game application 106 or may be part of a separate application (e.g., one or more system services, programs, etc.). The game data capturer 138 may be a component of the input device(s) 112 or may be executed by some other component of the client devices 104. The game data capturer 138 may include instructions that, when executed by a processor(s), cause the processor(s) to (by example and without limitation) record or log game data, such as input-device usage data, video data, and/or other data associated with a gameplay session. Examples of input-device usage data includes user input data descriptive or representative of keyboard, mouse, or other input-device usage, such as user input events, and that is associated with one or more gameplay sessions, such as the gameplay session 114. Examples of information that might be recorded include user input events, which may correspond to keyboard strokes, mouse clicks, mouse movement, microphone inputs, video-camera inputs, and/or inputs to the client devices 104 during the gameplay sessions. Examples of a user input event include a predefined input or combination of inputs that registers as a user input event (e.g., by an operating system of the client device 104(A)), such as a key press (e.g., a key down or a key up), a gesture, a mouse movement, a game command, or a predefined combination and/or pattern of particular key and/or other inputs (which may collectively register as a single input event). For example, a user input event may be identified for each key press provided to an input device.

Examples of the input events for the gameplay session 114 include the input events 118(A)-118(N), which may each be identified from corresponding input event data that is representative of an input event (also referred to as a "user input event"). For each input event, the game data capturer 138 may store metadata descriptive of or otherwise associated with the input event. As an example, the game data capturer 138 may store timestamp information (e.g., a timestamp) that correlates with timing information of the game-session data (e.g., along the timeline 148). Another example of the metadata is a gameplay session identification information (e.g., a gameplay session identifier) that identifies the gameplay session in which the input event was received. A further example of the metadata is an application or game identification information (e.g., an application or game identifier) that identifies the game or application in which the input event was received. A further example is input identification information (e.g., one or more input identifiers) that identifies what input(s) was actuated to trigger the user input event (e.g., a key(s) pressed).

The timeline 148 is associated with the gameplay session 114 and indicates relative time designations at which each of the time segments 150 may be sequentially positioned. For illustrative purposes, the time segments 150 are depicted on the timeline 148. Each time segment 150 may span a specific duration of time in the timeline 148, and may define one or more corresponding durations 152(A)-152(N). Each time segment 150 may be associated with one or more of the input events 118(A)-118(N). For example, any number of the input events 118(A)-118(N) may have a timestamp that falls within a corresponding time segment.

The duration determiner 140 may be configured to analyze user input data of gameplay sessions, such as input event data, to identify durations of relatively high user activity during the gameplay sessions. For example, the duration determiner 140 may analyze the input events 118 associated with the gameplay session 114 (and/or other game-session data) to determine the time segments 150 that define the corresponding durations 152. This analysis may be performed on real-time game-session data during a gameplay session, or on non-real-time game-session data (e.g., in the local storage 136), such as after completion of the gameplay session. The duration determiner 140 may be part of the game application 106 or may be part of a separate application (e.g., one or more system services, programs, etc.). In some examples, the duration determiner 140 is part of the same application as the game data capturer 138. Further, like the game data capturer 138, in some embodiments, the duration determiner 140 is at least partially on the video-clip server(s) 116 and/or the game server(s) 126 in addition to or instead of the client device 104(A). To identify durations of relatively high user activity, the duration determiner 140 may determine durations of relatively higher levels (e.g., frequencies or concentrations) of user activity during a gameplay session based on the input events. For example, the duration determiner 140 may use the input events 118 of the gameplay session 114 to determine the time segments 150 during the gameplay session 114 that include higher levels of action relative to other time segments in the gameplay session 114 and these the time segments 150 may define the durations 152 of relatively high user activity. For example, the time segment 150(A) within the gameplay session 114 may be identified by the duration determiner 140 as the duration 152(A) of relatively high user activity based at least in part on the time segment 150(A) having a relatively high value(s) of a user activity measurement for the time segment 150(A), which may correspond to high Keys Per Second (KPSs), a high percentage of action-key selections per second, and/or other frequency based input-device metrics. In at least one embodiment, to determine durations of relatively high user activity, the duration determiner 140 computes the user activity measurement and compares the user activity measurement to a threshold value. The duration determiner 140 may compute the user activity measurement for a gameplay session (e.g., the gameplay session 114) from the input events (e.g., the input events 118) of the gameplay session. To do so, the duration determiner 140 may analyze the input events using metadata associated with the input events, such as the timestamp information. For example, the timestamp information may be used to compute the frequency at which the input events are generated, the speed at which inputs are actuated, and whether and/or how many action commands that are predefined for a game of the gameplay session were actuated. By way of example, an action command may refer to a predefined input actuation (e.g., an input event) such as a key or combination of input actuations (e.g., an input event(s)) such as keys for a game that when present results in an objective being met in the game (e.g., left mouse button click initiates weapon deployment or changes weapons, right mouse button click initiates shield deployment, left trigger initiates vehicle drifting, keys a and b together with a right trigger may initiates building a structure, etc.). Action commands may be predefined for a particular game and/or games. Thus, one game or application may have a different set of action commands than another game or application. The input identification information may also be used in embodiments where the frequency is based on predefined input events or types of input events being generated (e.g., predefined inputs and/or action commands).

The user activity measurement may be a running user activity measurement having values computed periodically (e.g., every second) or iteratively and/or may be computed as needed. The duration determiner 140 may define a time segment of a gameplay session based at least in part on a time(s) that the user activity measurement determines a value(s) of the user activity measurement exceeds the threshold value (e.g., the user activity measurement threshold 256 of FIG. 2). For example, a start time of a duration may be (based on) a time at which the duration determiner 140 determines the user activity measurement has exceeded the threshold value such that it is greater than the threshold value. Additionally or alternatively, a time of a duration may be (based on) a time at which the duration determiner 140 determines the user activity measurement has exceeded the threshold value such that it is less than the threshold value.

In some examples, the time at which the user activity measurement exceeds the threshold value such that it is greater than the threshold value may be used as the start time of the time segment 150(A). Additionally or alternatively, the time at which the user activity measurement exceeds the threshold value such that it is less than the threshold value may be used as the end time of the time segment 150(A). In examples, a start time and/or an end time of a duration may be different than a time at which the duration determiner 140 determines the user activity measurement has exceeded the threshold value. For example, the duration determiner 140 may use the time to define the start time and may derive the end time from the start time (e.g., by adding a minute or other amount of time to the start time). Similarly, the duration determiner 140 may use the time to define the end time and derive the start time from the end time (e.g., by subtracting a minute or other amount of time from the end time). As further examples, the duration determiner 140 may use the time to define the start time and/or the end time as a duration of time that occurs before and/or after the identified time. For example, where the time corresponds to when the user activity measurement exceeds the threshold value, an amount of time may be added before and/or after that time to define the time segment.

In at least one embodiment, the threshold value may be hardcoded or may be computed. For example, the duration determiner 140 may compute a statistic from values of the user activity measurement over the gameplay session 114 and/or many gameplay sessions of the user and/or other users. The statistic may correspond to an average or percentile of the user activity measurement over at least a portion of a gameplay session(s). The statistic may be used as the threshold value or otherwise define the threshold value. The threshold value may be user-specific and based on user interactions with gameplay session and/or gameplay session specific based on the gameplay session being analyzed. In further embodiments, the determined statistic may be global and based on user interactions of other users in gameplay sessions of the game. Where the duration determiner 140 determines the threshold value during the gameplay session (e.g., in real-time) the statistic may be based on at least a portion of the gameplay session leading up to a current time (e.g., the time associated with the user activity measurement). Where the duration determiner 140 determines the threshold value after the gameplay session, the statistic may be based on at least any portion of the gameplay session before and/or after the time associated with the user activity measurement being compared to the threshold value. In any example, the statistic (and threshold value) may be updated based on the time being compared to the threshold value or the same statistic (or threshold value) may be used for each comparison.

In at least one embodiment, when identifying durations, the duration determiner 140 may distinguish between input events that correspond to gameplay activity and input events that correspond to non-gameplay activity. Input events that correspond to gameplay activity may include input events that control or effectuates gameplay within a gameplay session. An example of an input event that corresponds to gameplay activity is an action command. Further examples, include an input actuation or combination of input actuations that effectuate directional movement (e.g., steering, exploring, etc.), weapons deployment (e.g., firing a weapon, reloading a weapon, switching weapons, etc.), speed adjustments (e.g., running, walking, etc.), body positioning (e.g., standing, crouching, etc.), and the like.

In contrast, input events that correspond to non-gameplay activity may include input events that do not control or effectuate gameplay within a gameplay session. Examples of input events that correspond to non-gameplay activity may include input events that control or effectuate activity that accompanies or facilitates gameplay activity, such as communication between gamers (e.g., teammates, etc.) during a gameplay session, setting game options such as resolution, volume level, etc., navigating a menu to initiate gameplay, etc. For example, input events that correspond to non-gameplay activity may include those that initiate a communication mode between users and/or players (e.g., enables voice recordings, keyboard chat, etc.), define content of a communication (e.g., typing of a message), terminate the communication mode, and/or transmit the communication to at least one other user and/or player.

Various approaches may be used by the duration determiner 140 to identify input events that correspond to non-gameplay activity. In some examples, one or more input events may be predefined as non-gameplay activity commands (e.g., in the corresponding metadata) to indicate that corresponding non-gameplay activity. Non-gameplay activity commands may be game-specific and/or predefined for a particular game or games. In some examples, one or more non-gameplay activity commands may be predefined as initiation commands that initiate input events that correspond to non-gameplay activity and the duration determiner 140 may consider subsequent input events (e.g., of a particular type such as message defining or menu navigation input events) as non-gameplay activity (and/or perform further analysis to determine the input events correspond to non-gameplay activity based on identifying the command).

Also in some examples, one or more non-gameplay activity commands may be predefined as termination commands that terminate input events that correspond to non-gameplay activity and the duration determiner 140 may consider previous input events (e.g., of a particular type such as message defining or menu navigation input events) as non-gameplay activity (and/or perform further analysis to determine the input events correspond to non-gameplay activity based on identifying the command). For example, the duration determiner 140 may determine input events between an initiation command and a termination command correspond to non-gameplay activity. As indicated, one or more input events that correspond to gameplay activity may still be present between the commands (e.g., a user may use a mouse to control gameplay while typing a message on a keyboard), but the commands may identify particular types of input events as corresponding to non-gameplay activity.

In at least one embodiment, the duration determiner 140 may value (e.g., weight) input events that correspond to non-gameplay activity differently than (e.g., less than) input events that correspond to gameplay activity in computing the user activity measurement. As another example, the duration determiner 140 may discard input events that correspond to non-gameplay activity when computing the user activity measurement. These approaches may make it less likely that the duration determiner 140 identifies durations in which user activity is largely attributable to non-gameplay activity. In some embodiments, once the duration determiner 140 identifies a duration of relatively high user activity, the duration determiner 140 can compare the duration to a configurable minimum and/or maximum length duration threshold to determine whether to discard the duration or maintain the duration for additional analysis by, for example, the interest determiner 142. For example, the duration determiner 140 may discard an identified duration of relatively high user activity if the duration falls below the minimum length duration (e.g., 10 seconds or less). Similarly, the duration determiner 140 may discard or truncate the identified duration of relatively high user activity if the duration exceeds the maximum length duration (e.g., greater than one minute).

In embodiments, the minimum and maximum length durations may be hardcoded or configurable, or may be dynamic and automatically determined by the duration determiner 140. Also, in some examples, the duration determiner 140 may merge a duration with at least one other duration based on determining one or more of those durations fall below the minimum length duration. Another factor the duration determiner 140 may use to merge durations is the proximity of the durations in the gameplay session. For example, durations may be merged into a single duration based on the duration determiner 140 determining the durations are within a threshold proximity of one another. The duration determiner 140 may also add time to a duration (merged or otherwise) to reach at least the minimum length duration and/or truncate a duration (merged or otherwise) to stay under at least the maximum length duration.

The interest determiner 142 may be configured to determine and/or predict whether an identified duration (e.g., identified by the duration determiner 140) within a gameplay session is of sufficient interest for further action based on user input events generated by user inputs to one or more input devices during a gameplay session. As with the duration determiner 140, the interest determiner 142 may be part of the game application 106 or may be part of a separate application (e.g., one or more system services, programs, etc.). In some examples, interest determiner 142 is part of the same application as the game data capturer 138. Further, the interest determiner 142 may at least partially be instantiated or otherwise executed on the video-clip server(s) 116 and/or the game server(s) 126 in addition to or instead of being instantiated or otherwise executed on the client device 104(A).

To determine whether a duration is of sufficient interest for further action, the interest determiner 142 may compute a user interest score. The user interest score for a duration may be based on a set of the user input events of a gameplay session that occur during the identified duration. For example, for the duration 152(A), the user interest score may be computed from the input events 118 that have a timestamp within the duration 152(A) and/or the time segment 150(A) (e.g., between the start time and end time of the duration). The interest determiner 142 may compute the user interest score based on various factors, such as a number of the user input events that occur in the duration, one or more action commands that are entered during the duration, a length of the duration, a number or presence of input events that correspond to non-gameplay activity during the duration, and/or an actuation speed of the one or more input devices during the duration.

In at least one embodiment, the interest determiner 142 may value (e.g., weight) within a duration input events that correspond to non-gameplay activity differently than (e.g., less than) input events that correspond to gameplay activity in computing the user interest score for the duration. As another example, the interest determiner 142 may discard input events that correspond to non-gameplay activity when computing the user interest score or otherwise account for the presence and/or amount of those input events.

In operation, the duration determiner 140 identifies a duration to have relatively high user activity. Once a duration is identified, the interest determiner 142 may determine whether the identified duration is of sufficient interest based at least in part on calculating the user interest score for the identified duration by applying an interest-level algorithm to user input data associated with the identified duration. An example of such an algorithm is a High Energy Area Technique ("HEAT") algorithm, which can be expressed with the following equation (1):

$$\text{HEAT} = \log(k^*(A_{factor}^*D)^{2*}K_c^*S_{max}) \quad (1)$$

where,
$A_{factor}$=High constant (e.g., greater than 1), if an action command is present in the duration and is otherwise=1,
L=A length of the duration,
$K_c$=# of keys and/or input events in the duration,
$S_{max}$=Max speed of actuation among keys and/or input events in the duration, and
k=a constant.

Any of the above examples of factors for an interest-level algorithm may be used without the others and/or in a different formula or equation. In some examples, rather than being set to a high constant when an action command is present, the $A_{factor}$ may be based on (e.g., increase based on) the number of action commands in the duration. A user interest score may be computed for each duration that is specific to the duration. Based on the user interest scores (e.g., values of HEAT) for each identified duration, the interest determiner 142 may determine or predict which of those durations, if any, correlate with potentially high interest. For example, using the user interest scores, the interest determiner 142 may compare a threshold value to each user interest score to determine whether a duration(s) is of sufficiently high interest (e.g., is greater than the threshold value) to perform some further action, such as to present to a user. In some embodiments, the threshold value is a statistical value computed from the user interest scores of the identified durations of the gameplay session. In further examples, the statistical value may additionally or instead be computed from user interest scores of durations from one or more other gameplay session of the user, other users, and/or the same game.

As an example, the statistical value may correspond to a Median Absolute Deviation (MAD) score that is computed from the user interest scores. In any example, the statistical value may correspond to a minimum user interest score required for an identified duration to be determined or predicted to be of high interest. In operation, the interest determiner 142 may compare each user interest score of a duration to the determined statistical value to determine whether the further action is warranted for the duration. If the user interest score for an identified duration exceeds the statistical value, the identified duration may be deemed a duration of high interest and a corresponding action may be performed. Similarly, if the user interest score for an identified duration falls below the statistical value, the identified duration may be discarded as lacking sufficient predicted interest and/or a different corresponding action may be performed (or no duration action regarding the duration). MAD is one example of a statistical value which may be computed, but other statistics may be used, such as a standard deviation, an average, etc. In various examples, the statistical value may correspond to a robust statistic, such as a robust measure of statistical dispersion of the user interest scores (e.g., MAD).

In addition to or instead of using the statistical value to predict or determine whether a duration is of sufficiently high interest, the interest determiner 142 may user other factors, such as whether the duration includes at least one action command and/or whether the user interest score is greater than a baseline threshold value. For example, the interest determiner 142 may determine a duration is of sufficiently high predicted interest when its user interest score exceeds the statistical value. However, when the user interest score does not exceed the statistical value, the interest determiner 142 may still determine the duration is of sufficiently high interest based on the other factors.

The action(s) manager 130 may be configured to enable the various actions that may be performed during or after a gameplay session based on the interest determiner 142 determining and/or predicting a duration is of sufficiently higher interest for further action. For example, the action manager 130 may enable or cause presentation of an indication of the duration on a display, such as the display 108, as further described with respect to FIG. 3. In some embodiments, the indications include one or more buttons or other graphical user interface elements. When, actuated (e.g., by a user), the graphical user interface element(s) may initiate functions and operations to enable the user to perform various tasks relating to an identified duration. Examples include saving a video-clip corresponding to the duration (e.g., to the local storage 136) and/or sharing the video-clip (e.g., via social media). As further examples, an indication of a duration may include a notification, which may be presented on the client device 104(A). Examples include visual and/or audio content to notify the user of various actions that s/he can take during the gameplay session. These are just some non-limiting examples of the indications which may be presented for a duration(s).

The video-clip server(s) 116 may include one or more servers for storing, trimming, sharing, or otherwise editing video-clips associated with identified durations of relatively high interest recorded during gameplay session 114. Although only a few components and/or features of the video-clip server(s) 116 are illustrated in FIG. 1, this is not intended to be limiting. For example, the video-clip server(s) 116 may include additional or alternative components, such as those described below with respect to the computing device 900 of FIG. 9.

The video-clip server(s) 116 may be separate or distinct from the game server(s) 126; however, this is not intended to be limiting. Further, the video-clip server(s) 116 may not be included in some embodiments of the interest determining system 100, but may be used to facilitate one or more of the actions performed by the action manager 130. In some examples, the video-clip server(s) 116 may be implemented as the same or similar servers to the game server(s) 126 (e.g., running as a task on the game server(s) 126). In some examples, the video-clip server(s) 116 may be operated or hosted by a first entity (e.g., a first company) and the game server(s) 126 may be operated or hosted by a second entity (e.g., a second, different company). In such examples, the second entity may be a game developer or publisher, and the first entity and the second entity may share data such that the first entity can identify interesting video clips that correspond to the identified durations using data received from the second entity and/or the client device 104(A). In other examples, the video-clip server(s) 116 and the game server(s) 126 may be operated or hosted by the same entity. In further examples, the interest determining system 100 may be implemented completely on a client device 104 and/or one or more of the components and/or functionality thereof shown as being included in a server may be at least partially implemented on the client device 104.

The video-clip server(s) 116 may include a communications interface 122 and a data store(s) 124. As described herein, one or more video clips may be generated based on the durations of gameplay sessions, which may be identified and/or selected using the duration determiner 140 and/or the interest determiner 142. The video-clip server(s) 116 may receive the video clips based on the identified durations from the game server(s) 126 or the client device(s) 104. As another example, the video-clip server(s) 116 may receive the video clip timestamp data generated by the interest determiner 140 and generate the video clips from game-session data (e.g., video data) stored in a data store, such as the data store(s) 124, based on the identified durations of relatively high interest.

The communication interface 122 may include one or more components and features for communicating across one or more networks, such as the network(s) 102. The communication interface 122 may be configured to communicate via any number of network(s) 102, described herein. For example, to communicate in the interest determining system 100 of FIG. 1, the video-clip server(s) 116 may communicate over a LAN and/or the Internet with other video-clip server(s), the game server(s) 126, and/or the client devices 104. The video-clip server(s) 116 may exchange various information with the game server(s) 126 and/or the client device(s) 104, including video clips, information representative of an identified duration of high interest, and an indication of whether a video clip was shared or stored by a user or a duration was selected by a use for sharing, storage, or another action.

The game server(s) 126 may include one or more servers (e.g., dedicated game servers) for storing, hosting, managing, and, in some examples, rendering a game. In some examples, first game server(s) 126 may be used to create, update, and modify a game (e.g., the program code of the game), and second game server(s) 126 may be used to host the game (e.g., as dedicated game servers). Although only a few components and/or features of the game server(s) 126 are illustrated in FIG. 1, this is not intended to be limiting. For example, the game server(s) 126 may include additional or alternative components, such as those described below with respect to the computing device 900 of FIG. 9.

The game server(s) 126 may include one or more APIs to enable game play by the client device(s) 104 and/or to enable communication of information (e.g., user input data, etc.) with the video-clip server(s) 116. For example, the game server(s) 126 may include one or more game APIs that interface with the game applications 106 of the client devices 104 to enable game play by the client devices 104. As another example, the game server(s) 126 may include one or more gameplay session APIs that interface with the duration determiner 140 to pass data representative of durations of relatively high user activity to the interest determiner 142 for further analysis. As a further example, the game server(s) 126 may include one or more APIs that interface with the duration determiner 140 to receive the identified durations of relatively high user activity to determine whether each is a duration of sufficiently high interest for further action. Although different APIs are described herein, the APIs may be part of a single API, two or more of the APIs may be combined, different APIs may be included other than those described as examples herein, or a combination thereof.

The game server(s) 126 may include the game engine 128. The game engine 128 may include the functionality of a game that enables a game to be played by one or more users over a network, such as network(s) 102. For example, the gameplay session 114 may be played using the game engine 128. The game engine 128 may include a rendering engine, an audio engine, a physics engine, an animation engine, an artificial intelligence engine, a networking engine, a streaming engine, a memory management engine, and/or other components or features. The game engine 128 may be used to generate some or all of the user input data during a gameplay session.

The communication interface 132 of the game server(s) 126 may include one or more components and features for communicating across one or more networks, such as the network(s) 102. The communication interface 132 may be configured to communicate via any number of network(s) 102, described herein. For example, to communicate in the interest determining system 100 of FIG. 1, the game server(s) 126 may communicate over a LAN with other game server(s) and/or over the Internet with other game server(s) 126, video-clip server(s) 116, and/or the client devices 104.

Figure 2:
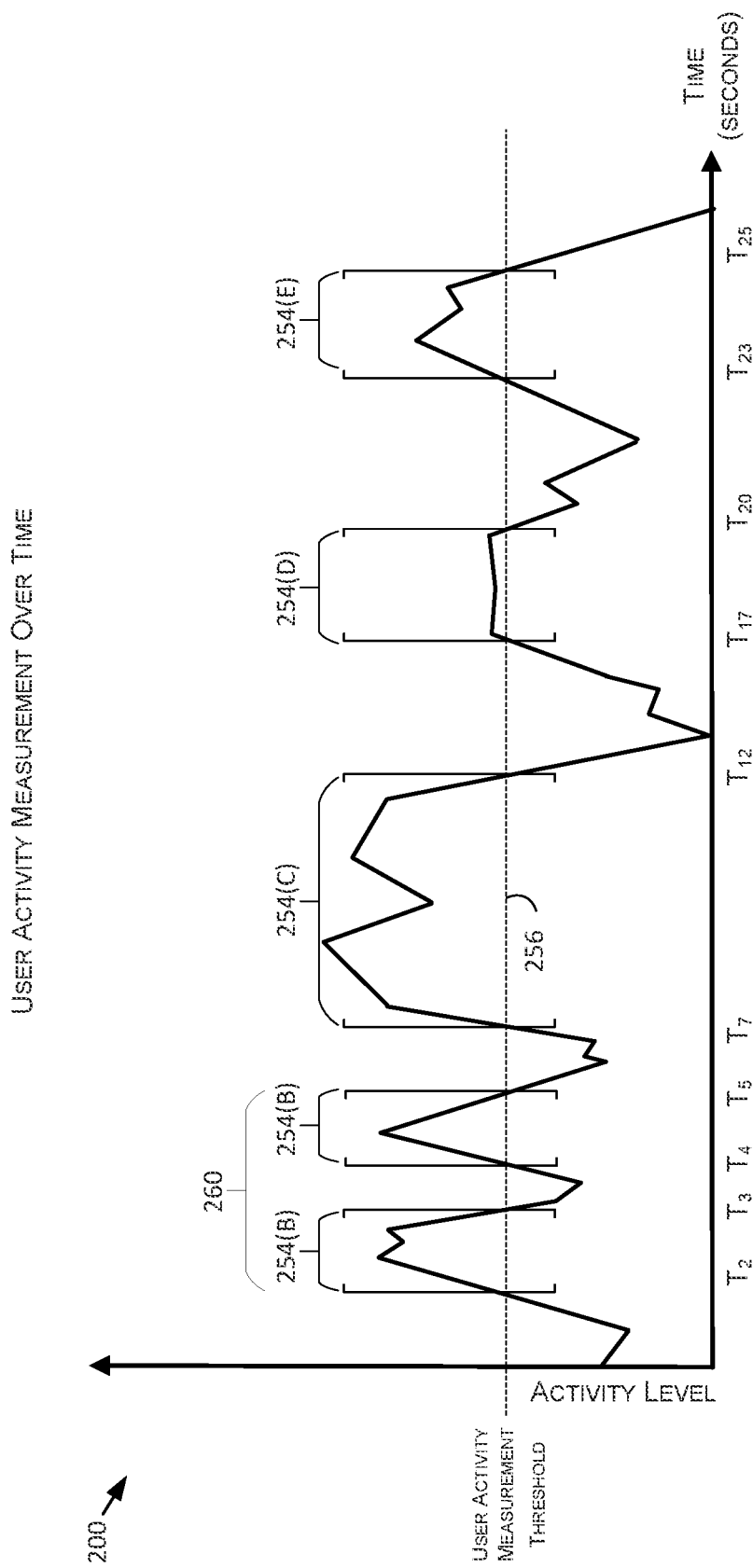
FIG. 2 is an example graphical representation illustrating potential high-interest durations of gameplay sessions from user inputs, in accordance with some embodiments of the present disclosure.

Referring now to FIG. 2, FIG. 2 is an example graphical representation illustrating potential high-interest durations of gameplay sessions from user inputs, in accordance with some embodiments of the present disclosure. FIG. 2 includes a graph 200, on which the x-axis represents time (in seconds), while the y-axis represents a value of a user activity measurement, as described herein. The graph 200 shows an example of a user activity measurement threshold 256, which the duration determiner 140 may use to identify a duration of relatively higher user activity. The user activity measurement threshold 256 may in some embodiments indicate or define a minimum level of the user activity measurement that must be reached for a duration of high user activity to be identified.

FIG. 2 graphically indicates time segments 254(A)-254(E) along with values of the user activity measurement at given times (T) during a gameplay session (e.g., the gameplay session 114). The duration determiner 140 may sample the values of the user activity measurement at any suitable time and/or interval(s) to determine the time segments 254(A)-254(E) and identify corresponding durations of relatively high user activity. The time segment 254(A) may be defined by times $T_2$ and $T_3$ at which the values are greater than the user activity measurement threshold 256. Also, the time segment 254(A) may be defined by times $T_4$ and $T_5$ at which the values are greater than the user activity measurement threshold 256. The duration determiner 140 may determine a duration corresponding to the time segment 254(A) and a duration corresponding to the time segment 254(B) using any suitable approach described herein. In some examples, the time $T_2$ may be a start time of the duration corresponding to the time segment 254(A) and the time $T_3$ may be an end time of the duration corresponding to the time segment 254(A). The other times labeled in FIG. 2 may similarly indicate start and end times of corresponding durations and/or time segments.

As described herein, in some embodiments, the duration determiner 140 may determine that the duration corresponding to the time segment 254(A) is less than a minimum length duration (e.g., defined by the time $T_3$ minus the time $T_2$). In such an example, the duration determiner 140 may merge the duration corresponding to the time segment 254(A) with the duration corresponding to the time segment 254(B). The merged duration may correspond to the time segment 260 of FIG. 2 and have a start time corresponding to the time $T_2$ of the time segment 254(A) and an end time corresponding to the time $T_5$ of the time segment 254(B). In some embodiments, the durations may be merged based on a proximity durations. For example, the proximity may correspond to a difference between the time $T_3$ of the time segment 254(A) and the time $T_4$ of the time segment 254(B). Where the difference is below a threshold value, the duration determiner 140 may merge the durations.

For example, a user may be playing a real-time strategy game in which the user is in the middle of a skirmish with an opponent. When the user is actively participating in the skirmish, the user activity measurement may be high. Should the user briefly retreat and wait for the opponent to pursue, however, the user activity measurement level might drop below the user activity measurement threshold 256, as shown. Subsequently, the opponent may pursue the user and the user may reengage the opponent resulting in a spike in the user activity measurement above the user activity measurement threshold 256, as shown. In this scenario, the duration determiner 140 may merge the durations together resulting a composite duration of relatively high user activity.

The duration determiner 140 may also determine a duration corresponding to the time segment 254(C) having a start time corresponding to time $T_7$ and/or an end time corresponding to time $T_{12}$. Further, the duration determiner 140 may determine a duration corresponding to the time segment 254(D) having a start time corresponding to time $T_{17}$ and/or an end time corresponding to time $T_{20}$. As a further example, the duration determiner 140 may determine a duration corresponding to the time segment 254(E) having a start time corresponding to time $T_{23}$ and/or an end time corresponding to time $T_{25}$.

In the examples described with respect to FIG. 2, the duration determiner 140 may identify four durations of relatively higher user activity in a corresponding game session. Those durations may correspond to the time segments 260, 254(C), 254(D), and 254(E). The interest determiner 142 may then compute a user interest score for each of the durations using approaches described herein (e.g., using HEAT). For example, the user interest score for the duration corresponding to the time segment 260 may be computed from the input events that occurred between the time $T_2$ and the time $T_5$. Further, the interest determiner 142 may compute the statistical value from the four user interest scores (e.g., a MAD score). The interest determiner 142 may determine that the user interest scores for each of the durations corresponding to the time segments 260, 254(C), and 254(E) are greater than (or equal to) the statistical value, and therefore of sufficient interest for further action by the action manager 130. The interest determiner 142 may also determine that the user interest score for the duration corresponding to the time segment 254(D) is less than the statistical value, and therefore may take no action on duration or provide a corresponding indicator to the action manager 130, such that a different action may be taken for that duration.

Figure 3:
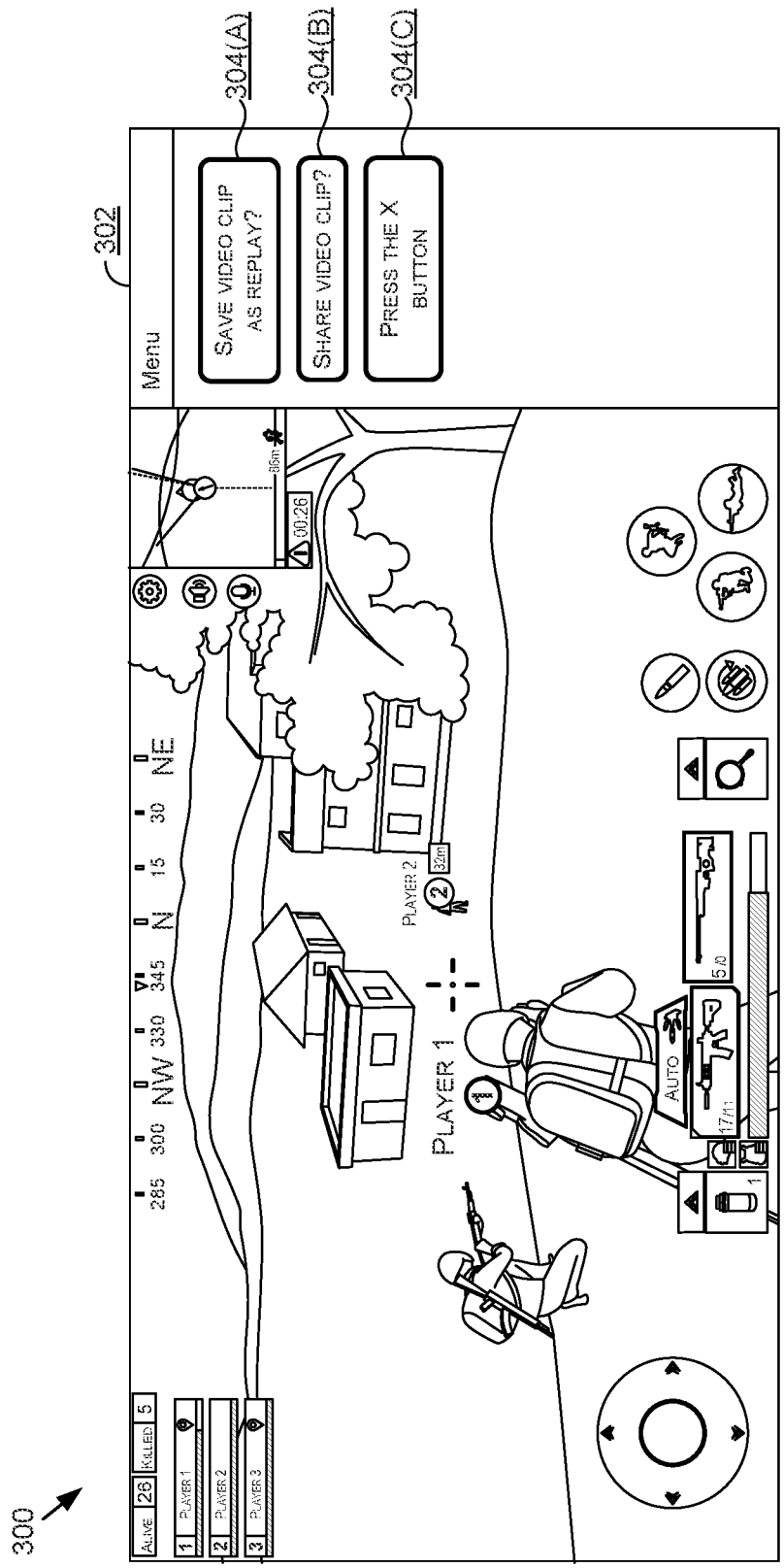
FIG. 3 is an example of a user interface that may be used to present an indication of a duration of a gameplay session, in accordance with some embodiments of the present disclosure.

With reference to FIG. 3, FIG. 3 is an example of a user interface that may be used to present an indication of a duration of a gameplay session. As described herein, the indication may be presented based at least in part on the user interest score for the duration exceeding the threshold value. The user interface is shown as being presented during a gameplay session, but could be presented at any suitable time and may or may not be part of the game and/or an application used to present the game. The indication shown includes graphical user interface elements that correspond to a duration(s).

As an example, a menu 302 is shown that displays graphical user interface elements as the indicators, such as buttons 304(A) and 304(B). When actuated (e.g., by a user), the buttons 304(A) and 304(B) initiate corresponding functions and operations to enable the action manager 130 to perform various tasks relating to an identified duration of relatively high user activity within the gameplay session.

For example, as a user (e.g., gamer) plays a game, user input data may be captured by the game data capturer 138 and used to identify durations of relatively high user activity, as described herein. Of the durations, the interest determiner 142 may determine a duration is of sufficiently high interest to present an indication of the duration. As a result, one or more of the buttons 304(A) and 304(B) may be populated on the display 108 to enable saving the identified duration(s) as a video clip(s) and/or sharing the identified duration(s) as a video clip(s). As such, upon actuation of the button 304(A) or 304(B), the identified duration of relatively high user activity within the gameplay session may be saved and/or shared.

The menu 302 of FIG. 3 also includes a notification 304(C) as another example of a potential indication of a duration. The notification 304(C) may notify a user of various actions that the user can take during the gameplay session. For example, if a user is attempting to complete a puzzle-based mission, but continually fails, the interest determining system 100 may recognize the user's inability to complete the puzzle based on a corresponding duration selected by the interest determiner 142. The notification 304(C) may be used to indicate to the user one or more user inputs to provide to advance or otherwise assist in the game.

The indications and notifications of FIG. 3 are merely examples of indications of durations that may be presented during or after a gameplay session. As described herein, and by way of non-limiting example, other indications may include a highlight reel or game summarization (e.g., video clips corresponding to the durations) presented during or after a gameplay session, as well as any other indication operable to save, edit, and/or share a video clip that corresponds to an identified duration (e.g., in a video editor application). In some embodiments, the interest determining system 100 may generate data representative of the highlight reel from the video clips (e.g., video frames extracted from video data of the gameplay session and/or timestamps of the video frames that correspond to the video clips) that correspond the durations and that are identified from video data of a gameplay session. For example, the video-clip server(s) 116, the game server(s) 126 (e.g., the game engine 128) and/or the client device 104(A) (e.g., the game application 106) may generate data representative of the highlight reel. In at least one embodiment the data includes identifiers (e.g., metadata) of locations of the video clips within a video that includes each of the video clips and optionally video clips of intervening portions of the gameplay session. Additionally or alternatively, in at least one embodiment the data includes video data, such as a concatenated sequence of the video clips, which may or may not include intervening video clips.

In some embodiments, the indications may be presented that enable the user to initiate the action manager 130 to take additional actions, including performing further analysis on the duration, such as by applying image and/or video data of game-session data that corresponds to the duration to an object detection model or other machine learning model (e.g., deep learning and/or convolutional neural network models). For example, the object detection model may be used to identify one or more objects in a scene, and based on the one or more objects, the action manager 130 may present content to the user during or after the gameplay session. The content may include, for example, presenting recommendations that are based on the object(s) such as button(s) to press or other user inputs to provide for a given situation. The notification 304(C) of FIG. 3 may be one such example of a recommendation. In further situations, a duration of high interest may be indicated to a user (e.g., as a recommendation) to assist he user in generating and/or selecting ground truth data (e.g., corresponding to the duration) to train a machine learning model.

Figure 4:
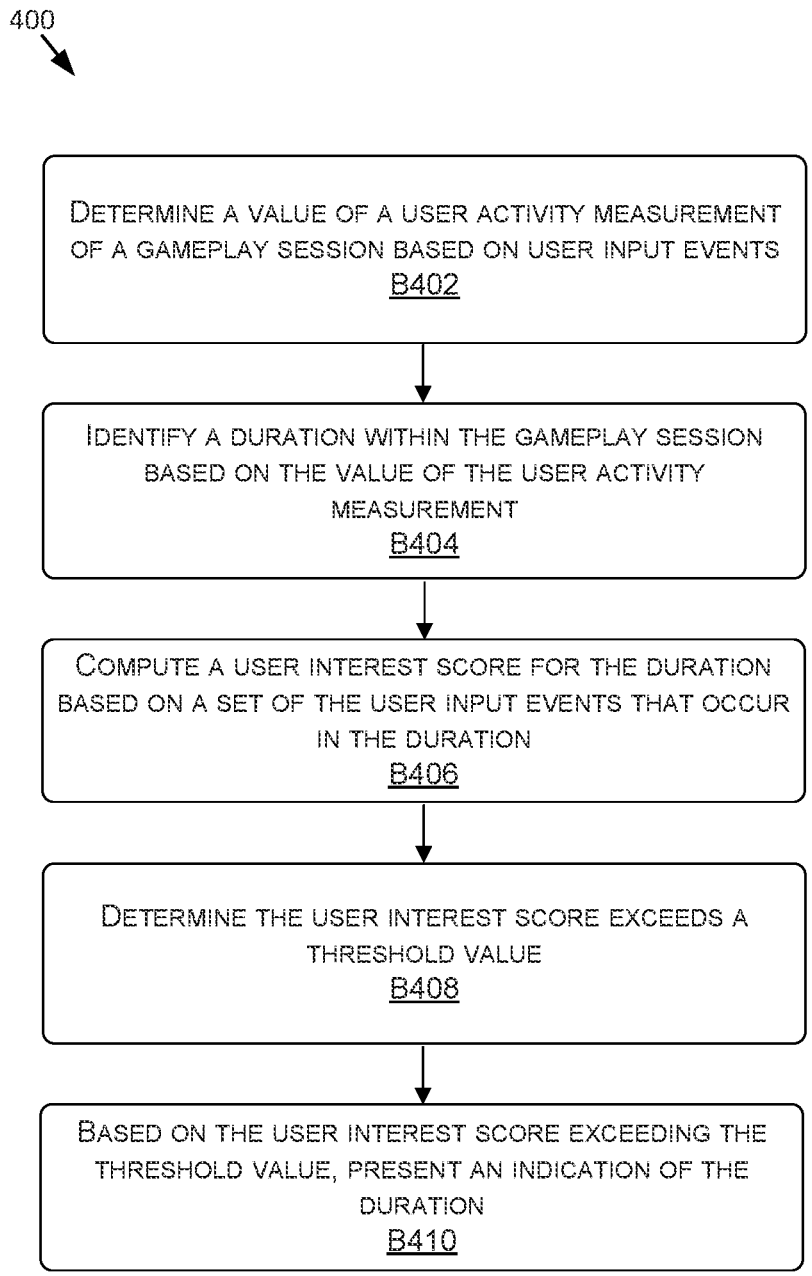
FIG. 4 is a flow diagram showing a method for determining a high-interest duration of a gameplay session from user input data based on a value of a user activity measurement, in accordance with some embodiments of the present disclosure.
Figure 5:
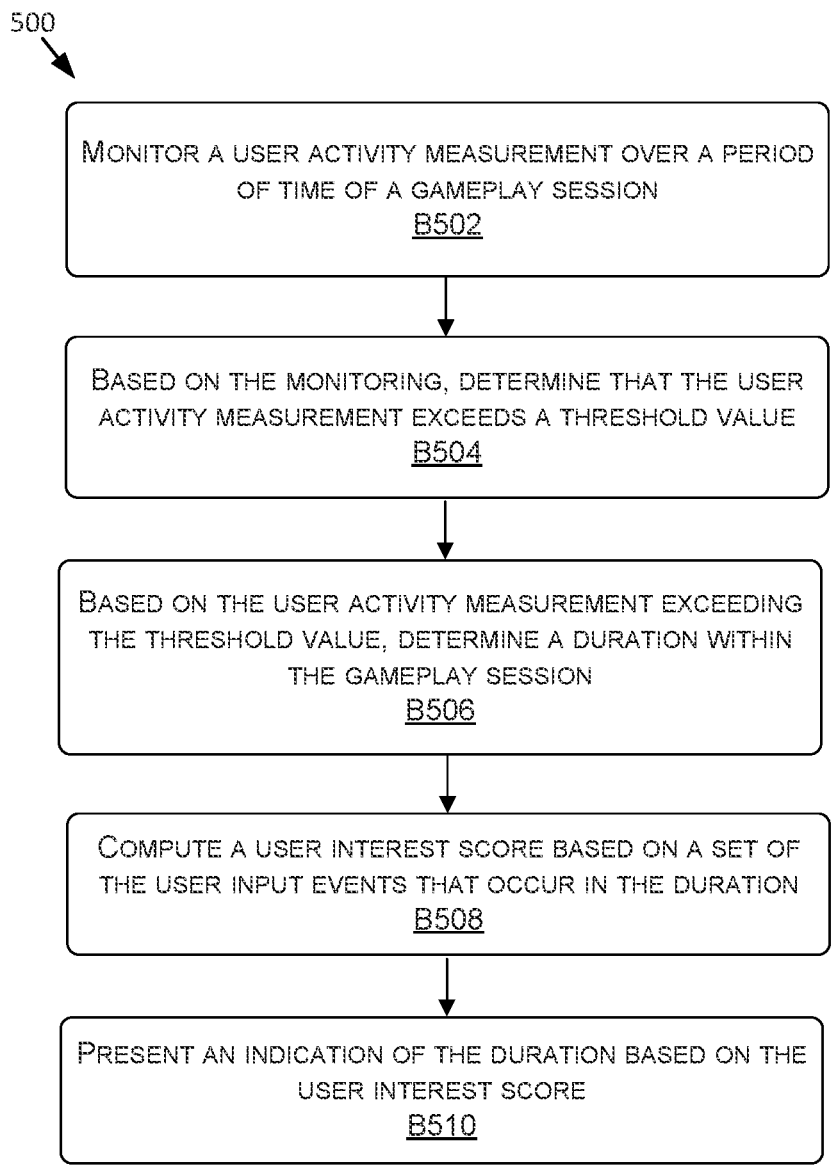
FIG. 5 is a flow diagram showing a method for monitoring a user activity measurement to determine high-interest durations of gameplay sessions from user input data, in accordance with some embodiments of the present disclosure.
Figure 6:
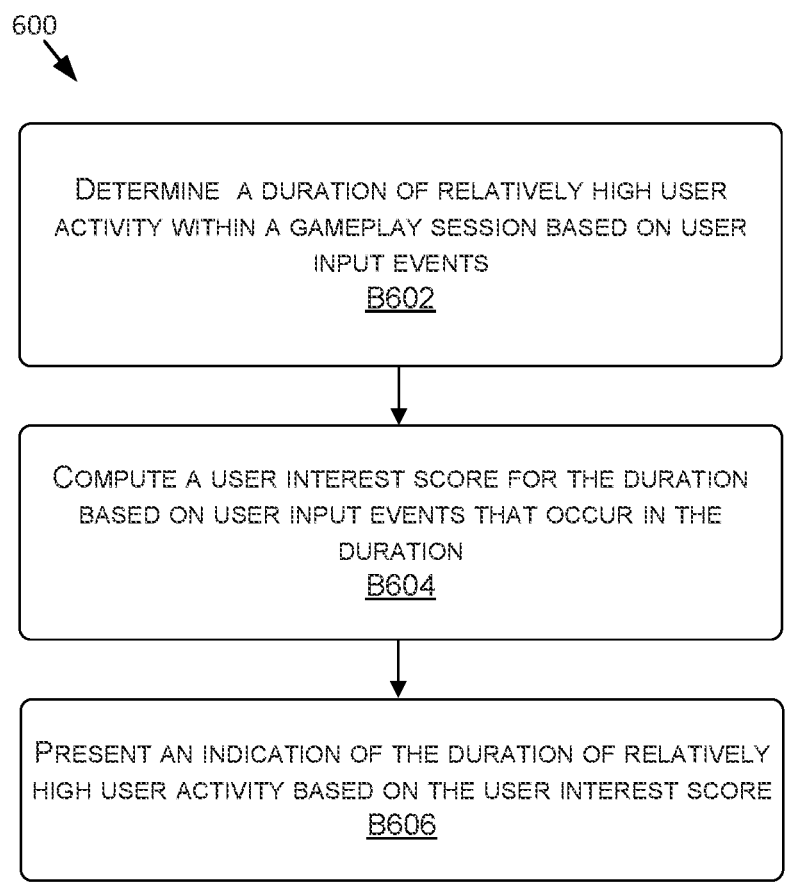
FIG. 6 is a flow diagram showing a method for determining a user interest score for a duration of relatively high user activity in a gameplay session from user input data, in accordance with some embodiments of the present disclosure.

Now referring to FIGS. 4 through 6, each block of methods 400 through 600 and other methods described herein comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 400 through 600 are described, by way of example, with respect to the interest determining system 100 of FIG. 1. However, these methods may additionally or alternatively be executed by any one system, or any combination of systems, including, but not limited to, those described herein.

FIG. 4 is a flow diagram showing a method 400 for determining a high-interest duration of a gameplay session from user input data based on a value of a user activity measurement, in accordance with some embodiments of the present disclosure. The method 400, at block B402, includes determining a value of a user activity measurement of a gameplay session based on user input events. For example, the duration determiner 140 may determine, from user input data of the gameplay session 114, a value of a user activity measurement of the gameplay session 114 based on the user input events 118 generated by user inputs to input devices during the gameplay session 114.

At block B404, the method 400 includes identifying a duration within the gameplay session based on the value of the user activity measurement. For example, the duration determiner 140 may identify a start and/or end time of the duration based on the value of the user activity measurement exceeding a threshold value.

At block B406, the method 400 includes computing a user interest score for the duration based on a set of the user input events that occur in the duration. For example, the interest determiner 142 may compute a user interest score for the duration based on a set of the user input events 118 that occur in the duration. The user interest score may be computed using an interest-level algorithm, such as HEAT.

At block B408, the method 400 includes determining the user interest score exceeds a threshold value. For example, the interest determiner 142 may determine the user interest score of the duration is greater than a MAD value or other statistical value computed from other durations of the gameplay session that are identified by the duration determiner 140.

At block B410, the method 400 includes based on the user interest score exceeding the threshold value, presenting an indication of the duration. For example, the action manager 130 may cause presentation of an indication of the duration on the client device 104(A) (e.g., as in FIG. 3).

Now referring to FIG. 5, FIG. 5 is a flow diagram showing a method 500 for monitoring a user activity measurement to determine high-interest durations of gameplay sessions from user input data, in accordance with some embodiments of the present disclosure. The method 500, at block B502, includes monitoring a user activity measurement over a period of time during a gameplay session. For example, the duration determiner 140 may monitor a user activity measurement of the gameplay session 114 over a period of time of the gameplay session 114. The user activity measurement may correspond to a frequency of the user input events 118 generated by user inputs to one or more input devices during the gameplay session 114. The monitoring may occur, for example, in real-time and/or during the gameplay session 114. For example, the duration determiner 140 may compute the user activity measurement periodically or at some interval or other trigger.

At block B504, the method 500 includes based on the monitoring, determining whether the user activity measurement exceeds a threshold value. For example, the duration determiner 140 may determine the user activity measurement has transitioned from being less than the user activity measurement threshold 256 to being greater than the user activity measurement threshold 256 of FIG. 2 or has transitioned from being greater than the user activity measurement threshold 256 to being less than the user activity measurement threshold 256 of FIG. 2.

At block B506, the method 500 includes based on the user activity measurement exceeding the threshold value, determining a duration of high user activity. For example, the duration determiner 149 may determine a time segment based on a time at which the user activity measurement exceeds the threshold value to determine a corresponding duration of high user activity.

At bock B508, the method 500 includes computing a user interest score based on a set of the user input events that occur in the duration. For example, the interest determiner 142 may compute the user interest score for the duration based on a set of the user input events 118 that occur within the duration.

At block B510, the method 500 includes presenting an indication of the duration based on the user interest score. For example, the action manager 130 may cause presentation of the indication on the client device 104(A).

FIG. 6 is a flow diagram showing a method 600 for determining a user interest score for a duration of relatively high user activity in a gameplay session from user input data, in accordance with some embodiments of the present disclosure. The method 600, at block B602, includes determining a duration of relatively high user activity within a gameplay session based on user input events. For example, the duration determiner 140 may determine, from user input data of the gameplay session 114, a duration of relatively high user activity within the gameplay session 114 based on the user input events 118 generated by user inputs to input devices during the gameplay session 114.

At block B604, the method 600 includes computing a user interest store based on user input events that occur in the duration. For example, the interest determiner 142 may compute a user interest store for the duration based on a number of the user input events 118 that occur in the duration of relatively high user activity and/or other factors associated the duration and/or with the user input events that are in the duration.

At block B606, the method 600 includes presenting an indication of the duration of relatively high user activity based on the user interest score. For examples, the action manager 130 may cause presentation on the client device 104(A) an indication of the duration of relatively high user activity based on the user interest score.

Figure 7:
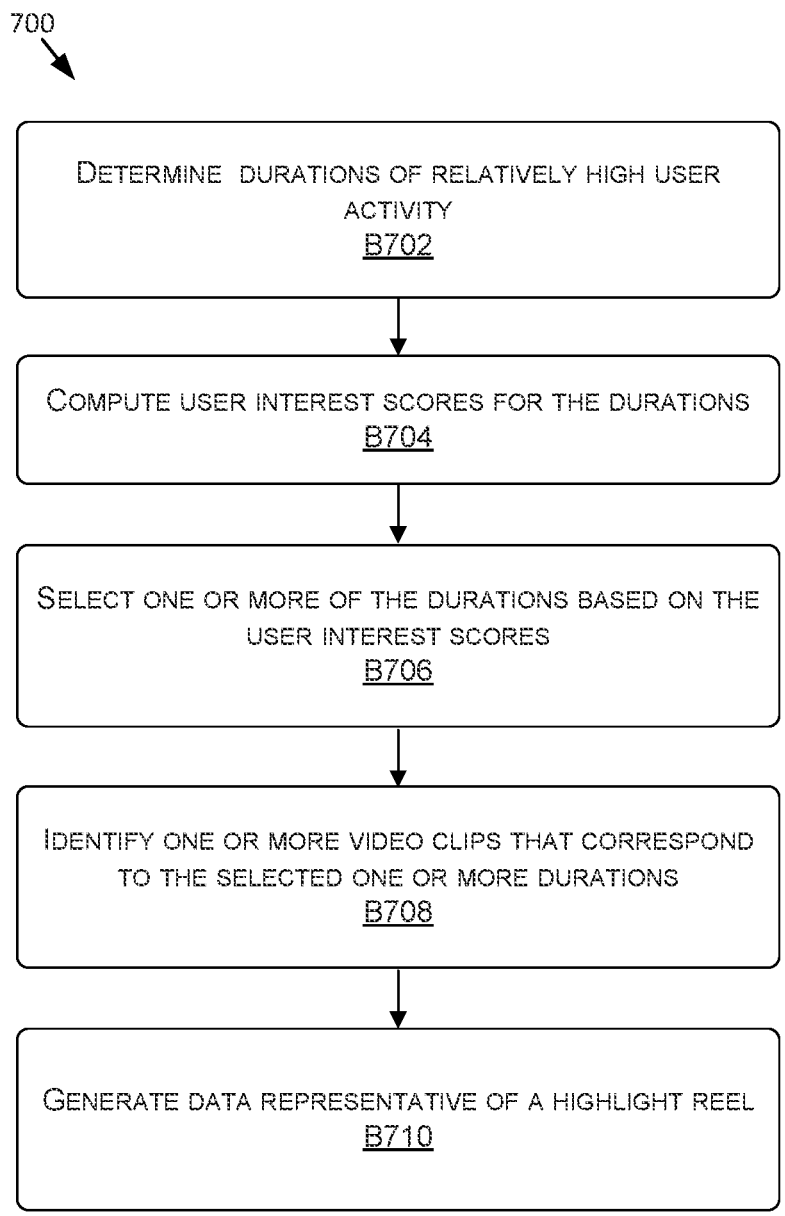
FIG. 7 is a flow diagram showing a method for generating data representative of a highlight reel based on durations of relatively high user activity in a gameplay session, in accordance with some embodiments of the present disclosure.

Now referring to FIG. 7, FIG. 7 is a flow diagram showing a method 700 for generating data representative of a highlight reel based on durations of relatively high user activity in a gameplay session, in accordance with some embodiments of the present disclosure. At block 702, the method 700 includes determining durations of relatively high user activity. For examples, the duration determiner 140 may determine durations of relatively higher user activity in the gameplay session 114 based on the input events 118.

At block 704, the method 700 includes computing user interest scores for the durations. For example, the interest determiner 142 may determiner user interest scores for the durations based on sets of the user input events 118 that occur in the durations.

At block 706, the method 700 includes selecting one or more of the durations based on the user interest scores. For example, the interest determiner 142 may select one or more of the durations based on comparing the user interest scores to a threshold value (e.g., a statistical value).

At block 708, the method 700 includes identifying one or more video clips that correspond to the selected one or more durations. For example, the video clip server(s) 116, the game application 106, the game engine 128 and/or the action manager 130 may identify one or more video clips that correspond to the selected one or more durations.

At block 710, the method 700 includes generating data representative of a highlight reel. For example, the game application 106, the game engine 128 and/or the action manager 130 may generate data representative of a highlight reel. The game application 106, the game engine 128 and/or the action manager 130 may also present the highlight reel, cause presentation of the highlight reel, and/or enable and facilitate or effectuate the user saving and/or sharing the highlight reel.

Figure 8:
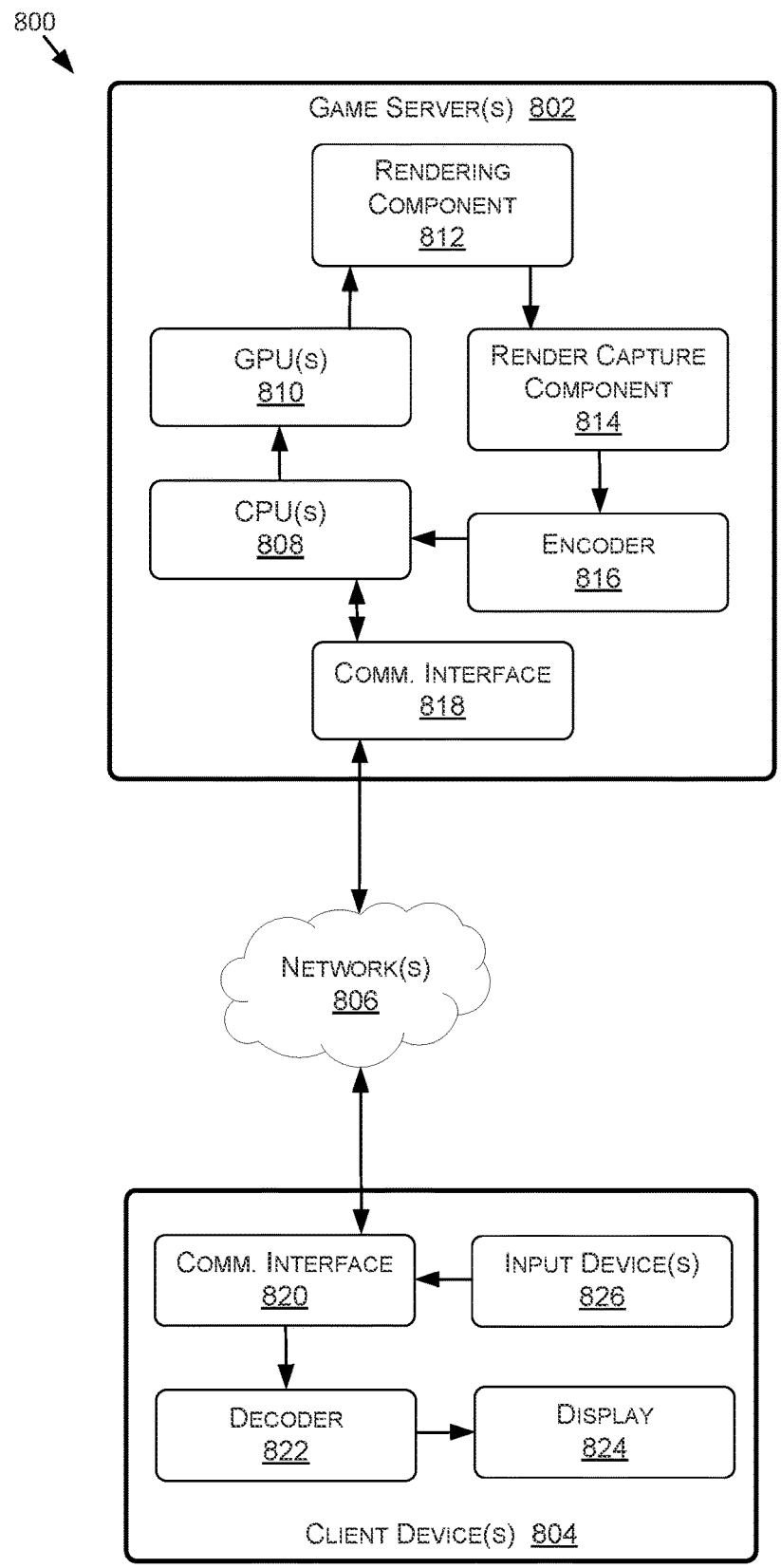
FIG. 8 is an example system diagram for a game streaming system, in accordance with some embodiments of the present disclosure.

Now referring to FIG. 8, FIG. 8 is an example system diagram for a game streaming system 800, in accordance with some embodiments of the present disclosure. FIG. 8 includes game server(s) 802 (which may include similar components, features, and/or functionality to the game server(s) 126 of FIG. 1 and/or the computing device 600 of FIG. 6), client device(s) 804 (which may include similar components, features, and/or functionality to the client devices 104 of FIG. 1 and/or the computing device 900 of FIG. 9), and network(s) 806 (which may be similar to the network(s) 102 of FIG. 1).

In at least one embodiment, the game server(s) 802 may host a cloud computing platform used by the client device(s) 804. For example, the gameplay sessions of a game(s) presented using the game application 106 of the client device 104(A) may be facilitated by the cloud computing platform. In various embodiments, the cloud computing platform may generate the rendering of the gameplay session (e.g., the video data thereof) that may be presented on the display 108. The cloud computing platform may, for example, by dynamically provisions and may provide wholly and/or partially virtualized computing environments. As an example, the cloud computing platform may run each game hosted on the cloud computing platform on one or more virtual machines.

In the system 800, for a gameplay session, the client device(s) 804 may only receive input data in response to inputs to the input device(s), transmit the input data to the game server(s) 802, receive encoded display data from the game server(s) 802, and display the display data on the display 824. As such, the more computationally intense computing and processing is offloaded to the game server(s) 802 (e.g., rendering of the gameplay session is executed by the GPU(s) of the game server(s) 802). In other words, the gameplay session is streamed to the client device(s) 804 from the game server(s) 802, thereby reducing the requirements of the client device(s) 804 for graphics processing and rendering.

For example, with respect to an instantiation of a gameplay session, a client device 804 may be displaying a frame of the gameplay session on the display 824 based on receiving the display data from the game server(s) 802. The client device 804 may receive an input to one of the input device(s) and generate input data in response. The client device 804 may transmit the input data to the game server(s) 802 via the communication interface 820 and over the network(s) 806 (e.g., the Internet), and the game server(s) 802 may receive the input data via the communication interface 818. The CPU(s) may receive the input data, process the input data, and transmit data to the GPU(s) that causes the GPU(s) to generate a rendering of the gameplay session. For example, the input data may be representative of a movement of a character of the user in a game, firing a weapon, reloading, passing a ball, turning a vehicle, etc. The rendering component 812 may render the gameplay session (e.g., representative of the result of the input data) and the render capture component 814 may capture the rendering of the gameplay session as display data (e.g., as image data capturing the rendered frame of the gameplay session). The encoder 816 may then encode the display data to generate encoded display data and the encoded display data may be transmitted to the client device 804 over the network(s) 806 via the communication interface 818. The client device 804 may receive the encoded display data via the communication interface 820 and the decoder 822 may decode the encoded display data to generate the display data. The client device 804 may then display the display data via the display 824.

Further, at least a portion of the game data capturer 138 of FIG. 1 may reside on a client device 804 and may be used to provide the input data and/or input event data to the game server(s) 802. The CPU(s) 808 may receive the input data, process the input data, and/or use the duration determiner 140 and/or the interested determiner 142 to identify durations and predict interesting durations. In at least one embodiment, the client device 804 may process the input data, and/or use the duration determiner 140 and/or the interested determiner 142 to identify durations and predict interesting durations.

Figure 9:
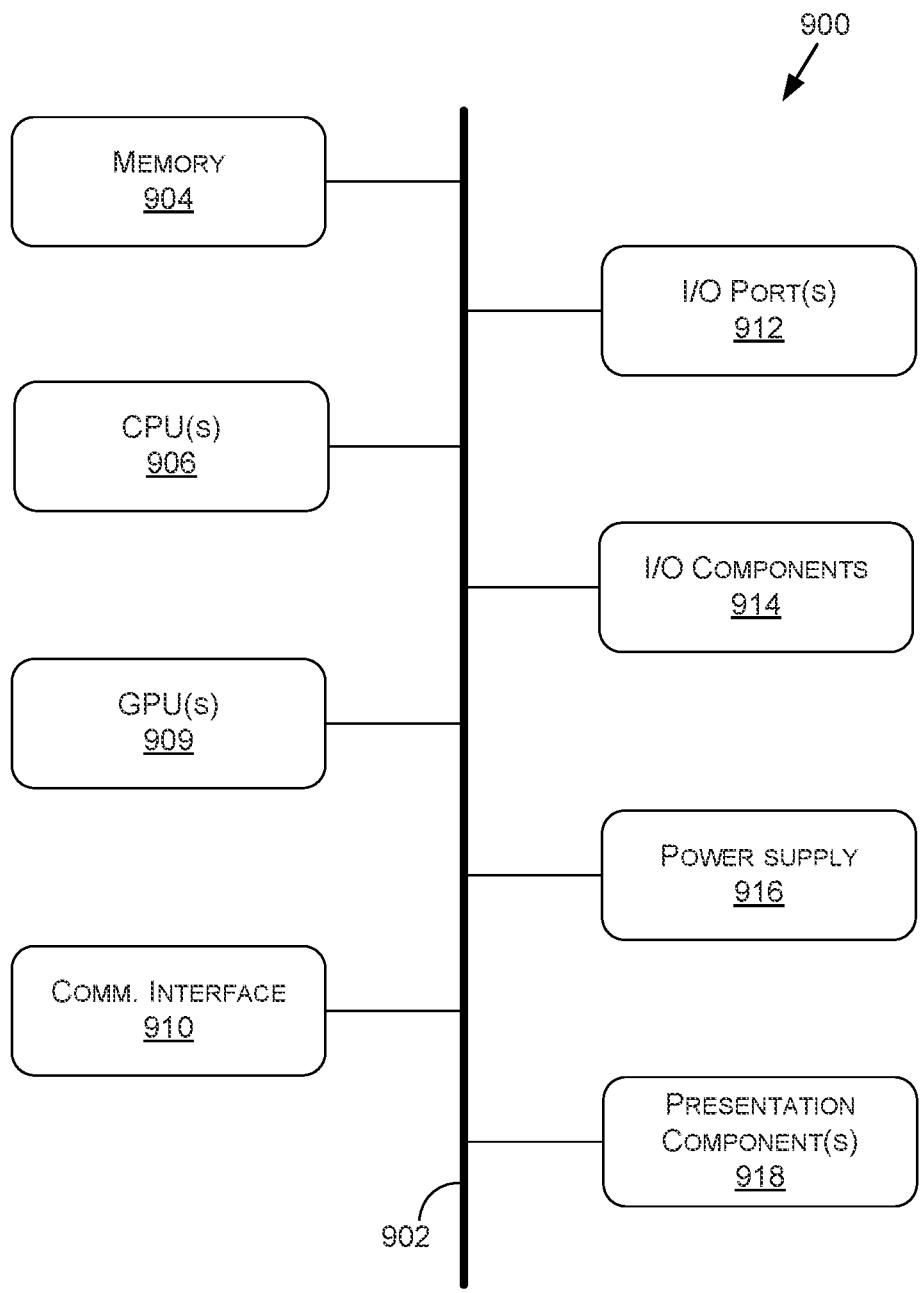
FIG. 9 is a block diagram of an example computing device suitable for use in implementing some embodiments of the present disclosure.

FIG. 9 is a block diagram of an example computing device 900 suitable for use in implementing some embodiments of the present disclosure. Computing device 900 may include a bus 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, and one or more presentation components 918 (e.g., display(s)).

Although the various blocks of FIG. 9 are shown as connected via the bus 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The bus 902 may represent one or more busses, such as an address bus, a data bus, a control bus, or a combination thereof. The bus 902 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 906 may be configured to execute the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an ARM processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

The GPU(s) 908 may be used by the computing device 900 to render graphics (e.g., 3D graphics). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data. The display memory may be included as part of the memory 904. The GPU(s) 808 may include two or more GPUs operating in parallel (e.g., via a link). When combined together, each GPU 908 may generate pixel data for different portions of an output image or for different output images (e.g., a first GPU for a first image and a second GPU for a second image). Each GPU may include its own memory, or may share memory with other GPUs.

In examples where the computing device 900 does not include the GPU(s) 908, the CPU(s) 906 may be used to render graphics.

The communication interface 910 may include one or more receivers, transmitters, and/or transceivers that enable the computing device 800 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   identifying a duration within a gameplay session based at least on user input events registered by an operating system and streamed to an application that corresponds to the gameplay session during the gameplay session;
   based at least on the identifying of the duration, determining a set of the user input events have occurred during to the duration;
   analyzing the set of the user input events determined to have occurred during the duration;
   computing a user interest score for the duration based at least on the analyzing of the set of the user input events; and
   generating one or more game summarizations corresponding to the gameplay session based at least on the user interest score.

2. The method of claim 1, wherein the application includes one or more of a game application, a streaming application, a chat application, or a user communication application.

3. The method of claim 1, wherein the analyzing includes computing, for the set of input events, an actuation speed of one or more input devices used to generate the set of the user input events and the user interest score is computed using the actuation speed.

4. The method of claim 1, wherein the analyzing includes computing a density of the set of input events, wherein the user interest score is computed using the density.

5. The method of claim 1, wherein the analyzing includes identifying, from the set of the user input events, one or more action commands that are predefined for a game of the gameplay session, wherein the user interest score is increased based on the one or more action commands being identified from the set of user input events, and wherein the one or more action commands represent a particular objective being met in controlling the game.

6. The method of claim 1, wherein the analyzing includes determining that the set of the user input events do not include one or more action commands that are predefined for a game of the gameplay session, wherein the user interest score is decreased based on the one or more action commands not being included in the set of user input events.

7. The method of claim 1, wherein the identifying the duration is based at least on analyzing a metric corresponding to a running frequency of the user input events.

8. The method of claim 1, wherein the analyzing includes identifying at least one user input event from the set of the user input events as corresponding to non-gameplay user activity, wherein the user interest score is computed based on the at least one user input event corresponding to non-gameplay user activity.

9. The method of claim 8, wherein the non-gameplay user activity corresponds to one or more of at least one communication between participants of the gameplay session or at least one user interaction with one or more menus corresponding to the gameplay session.

10. The method of claim 1, wherein the one or more game summarizations are presented based at least on determining the user interest score exceeds a threshold value, the threshold value corresponding to relative differences between user interest scores of a plurality of durations identified within one or more gameplay sessions.

11. A system comprising:
    one or more processing units to execute operations comprising:
    analyzing first user input events based at least on the first user inputs events having occurred during a first duration of a plurality of durations identified within a gameplay session;
    computing a first user interest score for the first duration based at least on the analyzing the first user input events;
    analyzing second user input events based at least on the second user inputs events having occurred during a second duration of the plurality of durations;
    computing a second user interest score for the second duration based at least on the analyzing the second user input events;
    selecting one or more durations of the plurality of durations based at least on the first user interest score and the second user interest score; and
    generating one or more game summarizations corresponding to the gameplay session based at least on the selecting.

12. The system of claim 11, wherein the operations include computing a statistical value from at least the first user interest score and the second user interest score, and the selecting the one or more durations is based on comparing at least the first user interest score to the statistical value.

13. The system of claim 11, wherein each of the user input events represents a respective button actuation or a respective combination of button actuations.

14. The system of claim 11, wherein the first user interest score and the second user interest score are computed using one or more values representing actuation speeds of one or more input devices used to generate the user input events.

15. The system of claim 11, wherein the first user interest score is computed based on a first length of the first duration and the second user interest score is computed based on a second length of the second duration.

16. The system of claim 11, wherein the analyzing the first user input events includes identifying at least one input event of the first user input events as corresponding to non-gameplay activity, wherein the first user interest score is computed based on the at least one input event corresponding to non-gameplay activity.

17. A processor comprising:
one or more circuits to:
determine durations of relatively high user activity within a gameplay session based at least on user input events registered by an operating system and streamed to an application that corresponds to the gameplay session;
analyze, for a duration of the durations, a set of the user input events determined to have occurred during the duration;
compute user interest scores for the durations based at least on the analyzing the set of the user input events;
select at least one duration from the durations based on the user interest scores; and
generate data representative of a highlight reel of the gameplay session based at least on the at least one duration.

18. The processor of claim 17, wherein the data representative of the highlight reel includes data representative of video frames extracted from video data corresponding to the at least one duration.

19. The processor of claim 17, wherein the determining the durations of relatively high user activity includes comparing a first indicia of a frequency of the user input events to a second indicia of a frequency of the user input events.

20. The processor of claim 17, wherein the one or more circuits are to merge at least a first of the durations with a second of the durations based at least on a a magnitude of a distance that separates the first of the durations from the second of the durations within the gameplay session to form a combined duration, wherein the highlight reel corresponds to the combined duration.

* * * * *